Patented July 13, 1948

2,444,994

UNITED STATES PATENT OFFICE 2,444,994

WELDING FLUX

Kenneth H. Koopman, Kenmore, N. Y., assignor to Haynes Stellite Company, a corporation of Indiana No Drawing. Application June 16, 1945, Serial No. 599,960

3 Claims. (Cl. 148—26)

This invention relates to welding fluxes.

For the purpose of protecting steel and iron articles from undue wear, it is common practice in the art to deposit on surfaces exposed to wear and abrasion a layer of a wear-resisting alloy, usually an alloy high in metal of the group chromium, tungsten, molybdenum, for instance, a cobalt-chromium-tungsten alloy. This surface layer of wear-resisting alloy is most often produced by fusion-deposition welding. Generally, no flux is necessary during the welding operation, but on occasion it is desirable to employ a welding flux. For example, when a series of parallel contiguous welding beads is produced, it is necessary to employ a flux to remove the tightly adherent refractory iron oxide scale generally formed along the base of each bead. If this oxide is not removed by the flux, difficulty is encountered in obtaining sound deposits and coalescence of contiguous welding beads and the base metal.

It is the principal object of this invention to provide a welding flux particularly suited to use in connection with fusion-deposition on a ferrous metal body of wear-resisting alloys, particularly those of the chromium-cobalt-tungsten type.

This object is achieved by the invention which comprises a flux composition containing about 5% to 15% sodium carbonate; 20% to 30% sodium sesquicarbonate; 6% to 12% sodium chloride; 5% to 10% calcium fluoride; the remainder substantially all borax glass, the minimum proportion of borax glass being 45%. By borax glass is meant the product resulting from fusing borax to eliminate its water of crystallization. Generally, the composition of the invention should contain not more than 60% borax glass. A specific example of a composition embodying the invention is a welding flux containing substantially 8% sodium carbonate; 22% sodium sesquicarbonate; 8% sodium chloride; 8% calcium fluoride; and 54% borax glass.

The composition of the invention has excellent properties rendering it particularly well suited for use in the fusion-deposition from a welding rod onto an iron or steel body of a wear-resisting cobalt-chromium-tungsten alloy. Its melting point is of substantially the same order as the melting points of these alloys. When molten its viscosity and surface tension are such that a satisfactory slag blanket forms over the molten pool of metal without running ahead of the welding zone. It combines readily with the iron oxides formed on the base metal during deposition of molten metal. Moreover, the slag produced is quiet, showing little evidence of foaming or fuming.

In utilizing the flux of the invention the conventional practice of periodically dipping the hot welding rod into the powdered flux may be followed. The flux adheres well to a hot rod, and a sufficient quantity of flux may be carried to the welding zone in this manner without waste of the flux. Other conventional methods of applying flux to the welding rod and to the welding zone may be practiced with the flux of this invention.

The composition ranges recited above should be observed with care in the preparation of the flux of this invention. The presence of the prescribed quantity of sodium sesquicarbonate, for example, is necessary to achieve good adherence of the flux to a welding rod. Similarly, the presence of the prescribed quantity of borax glass is necessary to achieve proper activity of the flux in combining with oxides.

The flux of the invention is prepared simply by mixing the dry constituents, preferably in finely divided form, in the proper proportions. The borax glass is prepared by fusing borax to eliminate its water of crystallization, allowing it to cool and then comminuting it, for example so that it will pass a 100 mesh (0.15 mm. openings) screen. The flux of the invention may be used with either oxy-fuel gas welding or electric arc welding procedures. It is particularly well adapted to use in manual oxyacetylene welding but may be used in automatic welding procedures.

I claim:

1. A flux composition containing 5% to 15% sodium carbonate; 20% to 30% sodium sesquicarbonate; 6% to 12% sodium chloride; 5% to 10% calcium fluoride; the remainder essentially all borax glass, the minimum proportion of borax glass being 45%.

2. A welding flux containing substantially 5% to 15% sodium carbonate; 20% to 30% sodium sesquicarbonate; 6% to 12% sodium chloride; 5% to 10% calcium fluoride; the remainder essentially all borax glass, the borax glass being at least 45% but not exceeding 60%.

3. A welding flux consisting substantially of 54% borax glass; 8% sodium carbonate; 22% sodium sesquicarbonate; 8% sodium chloride; 8% calcium fluoride.

KENNETH H. KOOPMAN.

REFERENCES CITED

The following references are of record in the file of this patent:

UNITED STATES PATENTS

| Number | Name | Date |
|---|---|---|
| 688,030 | Pich | Dec. 3, 1901 |
| 2,053,408 | Pfanstiehl | Sept. 8, 1936 |
| 2,368,280 | Wilson et al. | Jan. 30, 1945 |

FOREIGN PATENTS

| Number | Country | Date |
|---|---|---|
| 333,349 | Germany | Feb. 24, 1921 |